(12) United States Patent
Lai et al.

(10) Patent No.: US 8,901,223 B2
(45) Date of Patent: Dec. 2, 2014

(54) POLYMERS DERIVED FROM ITACONIC ACID

(75) Inventors: John Ta-Yuan Lai, Broadview Heights, OH (US); Gary A. Anderle, North Olmsted, OH (US); Ti Chou, Bay Village, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 13/990,214

(22) PCT Filed: Dec. 1, 2011

(86) PCT No.: PCT/US2011/062827
§ 371 (c)(1),
(2), (4) Date: May 29, 2013

(87) PCT Pub. No.: WO2012/075245
PCT Pub. Date: Jun. 7, 2012

(65) Prior Publication Data
US 2013/0248753 A1 Sep. 26, 2013

Related U.S. Application Data

(60) Provisional application No. 61/419,004, filed on Dec. 2, 2010.

(51) Int. Cl.
| | | |
|---|---|---|
| B29C 47/00 | (2006.01) |
| C08L 31/00 | (2006.01) |
| C08F 20/00 | (2006.01) |
| C08C 19/00 | (2006.01) |
| C08C 19/04 | (2006.01) |
| C08F 2/00 | (2006.01) |
| C08F 212/00 | (2006.01) |
| C08F 226/02 | (2006.01) |
| C08F 22/02 | (2006.01) |
| E04B 1/74 | (2006.01) |
| C08K 7/14 | (2006.01) |
| C08F 20/04 | (2006.01) |
| C08F 20/08 | (2006.01) |
| C08F 222/02 | (2006.01) |
| C08F 122/02 | (2006.01) |
| C08F 222/38 | (2006.01) |
| C08K 3/20 | (2006.01) |

(52) U.S. Cl.
CPC . *C08K 7/14* (2013.01); *C08F 20/04* (2013.01); *C08F 20/08* (2013.01); *C08F 22/02* (2013.01); *C08F 222/02* (2013.01); *C08F 122/02* (2013.01); *C08F 222/38* (2013.01); *C08K 3/20* (2013.01)
USPC ........ 524/388; 524/556; 525/329.5; 525/384; 525/387; 526/233; 526/307.5; 526/307.6; 526/318.2; 252/62

(58) Field of Classification Search
CPC ........ C08F 20/04; C08F 20/08; C08F 122/02; C08F 222/38; C08F 222/02; C08F 22/02; C08F 220/20; C08F 220/56; C08F 2220/1808; C08K 3/20; C08K 7/14
USPC ............... 524/388, 556; 525/329.5, 384, 387; 526/233, 307.5, 307.6, 318.2; 252/62
See application file for complete search history.

(56) References Cited

U.S. PATENT DOCUMENTS

| | | | | |
|---|---|---|---|---|
| 4,222,920 A | * | 9/1980 | Crisp et al. ..................... | 523/116 |
| 2009/0007990 A1 | * | 1/2009 | Klippel et al. ................ | 148/251 |

FOREIGN PATENT DOCUMENTS

| | | |
|---|---|---|
| DE | 102001041142 A1 | 3/2006 |
| EP | 0435505 A2 | 7/1991 |

* cited by examiner

*Primary Examiner* — William Cheung
(74) *Attorney, Agent, or Firm* — Samuel B. Laferty

(57) ABSTRACT

This invention relates to polymers containing structural units derived from itaconic acid which are useful as binders for fiberglass.

21 Claims, No Drawings

POLYMERS DERIVED FROM ITACONIC ACID

This application is a U.S. National Stage Filing under 35 U.S.C. 371 from International Application Number PCT/US2011/062827 filed Dec. 1, 2011, which claims the priority benefit of U.S. Provisional Application Ser. No. 61/419,004 filed Dec. 2, 2010.

TECHNICAL FIELD

This invention relates to polymers derived from itaconic acid. More particularly, this invention relates to polymers comprising structural units derived from itaconic acid which are useful as binders for fibreglass.

BACKGROUND

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. Formaldehyde-based binders are typically used. The residual heat from the glass fibers and the flow of air through the fibrous mat during the forming operation are generally sufficient to volatilize the majority to all of the water from the binder, thereby leaving the remaining components of the binder on the fibers as a viscous or semi-viscous high solids liquid. The coated fibrous mat is then transferred out of the forming chamber to a curing oven where heated air, for example, is blown through the mat to cure the binder and rigidly bond the glass fibers together.

Binders useful in fiberglass insulation products generally require a low viscosity in the uncured state, yet characteristics so as to form a rigid thermoset polymeric mat for the glass fibers when cured. A low binder viscosity, in the uncured state, is required to allow the mat to be sized correctly. Also, various binders tend to be tacky or sticky and hence they lead to accumulation of fibers on the forming chamber walls. This accumulated fiber may later fall onto the mat causing dense areas and product problems. A binder, which forms a rigid matrix when cured, is required so that a finished fiberglass thermal insulation product, when compressed for packaging and shipping, will recover to its specified vertical dimension when installed in a building.

Over the past several decades it has become necessary to minimize the emission of volatile organic compounds (VOCs) as a result of environmental regulations. This has led to extensive investigations into reducing emissions from formaldehyde-based binders, as well as searching for replacement binders that are formaldehyde-free. One such replacement binder employs polymers derived from acrylic acid.

SUMMARY

There are problems with using acrylic binders. These include the fact that acrylic acid is generally not considered to be "green" (it is typically derived from petroleum and is therefore not renewable) and its polymerization is often difficult to control. The present invention provides a solution to these problems. With the present invention, polymers derived from itaconic acid are used as binders for fiberglass products. Itaconic acid is "green" (it is derived from renewable resources) and it is non-toxic. Homopolymers of itaconic acid are biodegradable. Polymers derived from itaconic acid are easier and safer to handle than polymers of acrylic acid due to the fact that with polymers of itaconic acid no inhibitors are required.

This invention relates to a polymer comprising structural units derived from itaconic acid, or an anhydride or salt thereof, the polymer having a number average molecular weight of about 5000 or higher. When dissolved or dispersed in water at a concentration of about 50% by weight polymer, the resulting aqueous composition has a viscosity of about 750 centipoise or less. The polymer may comprise a homopolymer or a copolymer. The polymer may be grafted with one or more polyols. The polymer may be used as a binder for fiberglass. An advantage of using polymers derived from itaconic acid, or an anhydride or salt thereof, is that aqueous compositions (e.g., solutions or emulsions) containing the polymer that exhibit undesirable levels of color may have the color reduced or eliminated by treating the compositions with hydrogen peroxide.

DETAILED DESCRIPTION

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

Itaconic acid is an organic compound which is non-toxic and may be derived from renewable resources. Homopolymers of itaconic acid are biodegradable. Itaconic acid may be obtained by the distillation of citric acid or by the fermentation of carbohydrates such as glucose using *Aspergillus terreus*. Itaconic acid may be referred to as methylenesuccinic acid or 2-methylidenebutanedioic acid. Itaconic acid may be represented by the formula $C_5H_6O_4$ or by the formula $CH_2\!=\!C(COOH)CH_2COOH$.

The polymer may be derived from itaconic acid, anhydride or one or more salts of itaconic acid. The salts may include sodium, potassium or ammonium salts of itaconic acid. The salts may include alkylated ammonium salts such as triethyl ammonium salt, and hydroxyl alkylated ammonium salts such as triethanol ammonium salt, and the like.

The polymer may be a homopolymer wherein the polymer backbone comprises structural units derived from itaconic acid, or an anhydride or salt thereof. The polymer may be a copolymer wherein the backbone of the polymer comprises structural units derived from itaconic acid, or an anhydride or salt thereof, as well as structural units derived from one or more co-monomers such as $C_1$-$C_{18}$ alkyl (meth)acrylates where the alkyl group may be a straight chain group or branched chain group. The alkyl group may be substituted with one or more hydroxyl groups, alkoxy groups, or a mixture thereof. The monomers that may be used may include methyl acrylate, ethyl acrylate, butyl acrylate, 2-hydroxyethyl acrylate, 2-hydroxyethyl methacrylate, stearyl acrylate, polyethyleneglycol monomethylether acrylate, acrylamide, $C_1$-$C_{18}$ N-alkyl (meth)acrylamide, styrene and substituted styrene, vinyl esters such as vinyl acetate, acrylic acid and its sodium salt, 2-acrylamido-2-methylpropane sulfonic acid and its salts (AMPS™), acrylamido methanesulfonic acid and its sodium salt, maleic acid and its sodium salt, (meth) acrylonitrile, or a mixture of two or more thereof. The amount of co-monomer in the copolymer may be up to about 50% by weight of the copolymer, or from about 5 to about 50%, or from 5% to about 30%, or from about 10% to about 20% by weight of the copolymer. The amount of itaconic acid (the itaconic acid, itaconic anhydride, and the itaconic acid from the salt form of itaconic acid combined) is desirably at least 50, more desirably at least 70, and preferably at least 80% by weight of said polymer or copolymer derived from itaconic acid.

The polymer may comprise a grafted polymer or copolymer wherein one or more polyols are grafted to the polymer backbone. The polyol may comprise any polyol with a molecular weight of up to about 1000, or in the range from about 50 to about 1000, or from about 50 to about 750, that contains 2 or more hydroxyl groups, or from 2 to about 6 hydroxyl groups, or from 2 to about 4 hydroxyl groups. Examples of the polyols that may be used include ethylene glycol, glycerol, 1,3-propanediol, starch, pentaerythritol, trimethylolpropane, sorbitol, sucrose, xylitolglucose, resorcinol, catechol, pyrogallol, glycollated ureas, 1,4-cyclohexanediol, diethanolamine, triethanolamine, or a mixture of two or more thereof. In one embodiment it is preferred that at least 50 wt. % of the polyols be glycerol.

The number of structural units derived from itaconic acid, or anhydride or salt thereof, and/or the one or more co-monomers referred to above in the polymer backbone that may be grafted with a polyol may be up to about 30% of the structural units, or from about 1% to about 30%, or from about 1% to about 20% of the structural units may be grafted with a polyol. The number of structural units derived from itaconic acid, or anhydride or salt thereof, in the polymer backbone that may be grafted with a polyol, may be up to about 30% of the structural units, or from about 1% to about 30%, or from about 1% to about 20% of the structural units may be grafted with a polyol.

The number average molecular weight of the polymer acid may be about 5000 or higher, or in the range from about 5000 to about 20,000, or from about 5000 to about 10,000, or from about 7000 to about 9000, or from about 8000 to about 9000.

When the polymer is dissolved or dispersed in water at a concentration of about 50% by weight polymer, the resulting aqueous composition may have a viscosity of up to about 750 centipoise, or in the range from about 50 to about 750 centipoise, or from about 50 to about 600 centipoise, or from about 100 to about 500 centipoise. The aqueous composition may comprise a solution or an emulsion.

The polymer may be made by polymerizing itaconic and, optionally, one or more co-monomers using any conventional method such as solution polymerization in water or solvent, emulsion polymerization, reverse emulsion polymerization, suspension polymerization, precipitation polymerization, dispersion polymerization, and the like. The polymerization may be conducted using one or more initiators and/or promoters, as well as one or more of the co-monomers. Initiators, such as sodium persulfate or ammonium persulfate, may be used. Accelerators, such as phosphorus-containing accelerators, may be used. The accelerators that may be used may include sodium hypophosphite, sodium hypophosphite hydrate, and mixtures thereof. The co-monomers may be any of the co-monomers referred to above, including ethyl acrylate, 2-hydroxyethyl acrylate, acrylamide, and the like, as well as mixtures of two or more thereof. In one embodiment it is preferred that the co-monomers include acrylamide alone or acrylamide in combination with at least 2-hydroxyethyl acrylate. The polyol, when grafted on the polymer backbone, may be added to the reaction mixture during polymerization. If the resulting polymerized product has undesirable levels of color, the color may be removed or reduced by adding an effective amount of hydrogen peroxide to the reaction mixture to remove such color or to reduce it to acceptable levels after the polymerization has been completed. The amount of hydrogen peroxide is added to the reaction mixture may be up to about 10% by weight of the reaction mixture, or from about 0.1 to about 10% by weight, or from about 0.1% to about 6% by weight.

The conversion of itaconic acid to polymer may be at least about 85%, or from about 85% to about 99.5%, or from about 94% to about 99%. It was unexpectedly discovered that when polymerizing itaconic acid in the presence of a polyol to form a grafted polymer, the amount of polymer obtained increased by at least about 5%, or from about 5% to about 300%.

An advantage of the invention is that when the itaconic acid, or an anhydride or salt thereof, is polymerized in the presence of a polyol, higher conversions of monomer to polymer may be achieved as compared to when the polyol is not present. This is significant due to the fact that itaconic acid is typically regarded as a monomer that is slow to polymerize. Also, during curing, the polymer crosslinks with the polyol, and, as such, part of the curing may be effected by grafting the polyol on the polymer.

Another advantage of polymerizing itaconic acid, or an anhydride or salt thereof, in the presence of a polyol is that the polymerization process may be simplified due to the fact that additional processing steps of adding the polyol after the polymerization is completed can be avoided. Also, the use of an additional blend tank for mixing the polymer with the polyol can be avoided.

It was unexpectedly discovered that the grafting of the polyol on the polymer backbone could be achieved without gelling. When copolymerizing itaconic acid with more than 15 mole % of the hydroxyalkyl (meth)acrylate, the polymer gels quickly, presumably due to the grafting of the hydroxyl groups during polymerization. With three hydroxyl groups in glycerol, even when used in large amounts, the polymer does not gel when polymerizing the itaconic acid in the presence of the polyol.

The achievement of number average molecular weights in excess of about 5000 for the polymer was unexpected because itaconic acid is a strong chain transfer agent. This usually reduces the molecular weight.

The polymerization of itaconic acid in the presence of a polyol may provide for a polymerization with less than about 10%, or less than about 5% by weight residual itaconic acid monomer. This was unexpected.

The polymer may be dissolved or dispersed in water to form an aqueous binder for fiberglass products, such as fiberglass insulation products, fiberglass filtration products, fiberglass reinforcement mats for construction articles such as duct liners, wallboard composites, pacer sheets, and the like. The aqueous binder may comprise water, and from about 20 to about 70% by weight solids, or from about 25% to about 65%, or from about 30% to about 60%, or from about 40 to about 50% by weight solids. The term "solids" is used herein to refer to the polymer as well as any other ingredient other than water. The concentration of the polymer in the aqueous binder may be in the range from about 20% to about 70% by weight, or from about 25% to about 60% by weight. The aqueous binder may comprise monomeric itaconic acid at a concentration of up to about 15% by weight, or from about 0.5 to about 15% by weight, or from about 0.5 to about 10% by weight, or from about 1 to about 6% by weight. The aqueous binder may contain one or more polyols that are not grafted to the polymer, the concentration of the one or more polyols being up to about 30% by weight, or from about 5% to about 30%, or from about 5 to about 25% by weight, or from about 10 to about 20% by weight. The aqueous binder may further comprise one or more additional ingredients including one or more emulsifiers, pigments, filler, anti-migration aids, curing agents, coalescents, wetting agents, biocides, plasticizers, organosilanes, anti-foaming agents, colorants, waxes, anti-oxidants, and the like, or a mixture of two or more thereof. The concentration of each of these additional ingredients may be up to about 10% by weight. The aqueous binder may be characterized by the absence of formaldehyde.

The aqueous binder may be prepared by dissolving or dispersing the polymer and any of the other desired ingredients in water using conventional mixing techniques. It was unexpectedly discovered that when the polymer is grafted with a polyol, the aqueous binder exhibit a lower viscosity as compared to when using a non-grafted polymer. This advantage may be used to allow for providing aqueous binders that are more concentrated (that is, containing less water) and as a result less costly to ship.

The aqueous binder may be applied to a fiberglass substrate, such as a nonwoven fiberglass substrate, by conventional techniques such as air or airless spraying, padding, saturating, roll coating, curtain coating, beater deposition, coagulation, and the like. The aqueous binder may be applied to a fiberglass mat formed on a paper machine or via a wet-laid process. The aqueous binder may be sprayed, saturated, or coated onto fiberglass used for applications such as insulation products, filtration products, reinforcement mats for construction articles, and the like.

The aqueous binder, after it is applied to fiberglass, may be heated to effect drying and curing. The duration and temperature of heating will affect the rate of drying, processability and handleability, and property development of the treated substrate. Heat treatment at about 120° C. to about 400° C., or at about 150° C., to about 220° C., for a period of time in the range from about 3 seconds to about 15 minutes may be carried out. The drying and curing functions may be effected in two or more distinct steps, if desired. For example, the aqueous binder, after being applied, may be first heated at a temperature and for a time sufficient to substantially dry but not to substantially cure the binder composition, and then heated for a second time at a higher temperature and/or for a longer period of time to effect curing. This procedure, which may be referred to as "B-staging", may be used to provide binder-treated nonwoven fiberglass, for example, in roll form, which may, at a later stage, be cured, with or without forming or molding into a particular configuration, concurrent with the curing process.

Fiberglass products may be prepared using conventional techniques. For example, a porous mat of fibrous glass may be produced by fiberizing molten glass and immediately forming a fibrous glass mat on a moving conveyor. The aqueous binder may then be applied to the mat to form a treated mat. The treated mat may then be conveyed through a curing oven wherein heated air is passed through the mat to cure the polymer resin. The mat may be slightly compressed to give the finished product a predetermined thickness and surface finish. The curing oven may be operated at a temperature in the range from about 120° C. to about 400° C., or from about 150° C. to about 220° C. The mat may reside within the oven for a period of time in the range from about 3 seconds to about 15 minutes. A fibrous glass, with a cured, rigid binder matrix, may emerge from the oven in the form of a batt which may be compressed for packaging and shipping and which may thereafter recover its vertical dimension when unconstrained.

The fiberglass products may be used for applications such as, for example, insulation batts or rolls, as reinforcing or insulation mat for roofing or flooring applications, as roving, as microglass-based substrates for printed circuit boards or battery separators, as filter stock, as tape stock, as tack board for office partitions, in duct liners or duct board, wallboard composites, pacer sheets, reinforcement scrim for cementitious and non-cementitious coatings for masonry, and the like.

Example 1

In a 2-liter reactor, the following ingredients are added: 260 g itaconic acid, 136.6 g glycerol, 330 g water and 4 g sodium persulfate. After purging with nitrogen for 20 minutes, the reaction mixture is heated to 75° C. under nitrogen over a period of 40 minutes. After 20 minutes at 75° C., the addition of an initiator in the form of a solution of 8 g sodium persulfate in 40 g water is commenced, the initiator being metered in over a period of 4 hours. After another 10 minutes, the addition of a premix of 9 g ethyl acrylate, 20.9 g 2-hydroxyethyl acrylate, 27.3 g of a 52% by weight acrylamide aqueous solution, and 15 g water is commenced, the premix being metered in over a period of 2 hours. The reaction temperature is raised to 78° C. after the initiator is metered in and maintained at that level for 75 minutes. The reaction mixture is cooled in air to 60° C. When the 60° C. temperature is reached, a redox system of (1) 1.25 g sodium persulfate in 8 g water, and (2) 1.25 g of Bruggolite® FF6 (a product of Bruggeman Chemical identified as a derivative of sulfinic acid) in 20 g water, is added, the addition of (1) and (2) being in sequence. The temperature is reduced to below 30° C. A solution of 28% by weight ammonium hydroxide is added to raise the pH to 3.3. The reaction mixture is stirred for 30 minutes. 13.5 g of a 50% hydrogen peroxide solution is added to remove color. Post reaction analysis indicates a residual monomer concentration of 1.6% by mole from proton NMR spectrum, and a calibrated absolute number average molecular weight for the polymer of 8140 using gel permeation chromatography with light scattering detector.

Example 2

In a 55 liter reactor, the following ingredients are added: 25.42 pounds (11.53 kg) itaconic acid, 13.36 pounds (6.06 kg) glycerol, 0.39 pound (0.18 kg) sodium persulfate and 34.79 pounds (15.8 kg) of water. After purging with nitrogen for 20 minutes, the reaction mixture is heated to 75° C. under nitrogen over a period of 40 minutes. After 20 minutes at 75° C., the addition of an initiator in the form of a solution of 0.78 pound (0.354 kg) sodium persulfate in 3.91 pounds (1.77 kg) water is commenced, the initiator being metered in over a period of 4 hours. After another 10 minutes, the addition of a premix of 0.88 pound (0.399 kg) ethyl acrylate, 2.04 pounds (0.925 kg) 2-hydroxyethyl acrylate, and 2.67 pounds (1.121 kg) of a 52% by weight acrylamide aqueous solution is commenced, the premix being metered in over a period of 2 hours. The reaction temperature is raised to 78° C. after the initiator is metered in and maintained at that level for 75 minutes. The reaction mixture is cooled in air to 60° C. When the 60° C. temperature is reached, a redox system of 0.12 pound (0.054 kg) sodium persulfate in 1.96 pounds (0.481) water is added, followed by 0.12 pound (0.054) of Bruggolite® FF6 in 1.96 pounds (0.899 kg) water. The temperature is reduced to 30° C. 1.43 pounds (0.649 kg) of concentrated ammonium hydroxide is added to raise the pH to 3.3, followed by 1.89 pounds (0.857 kg) of 35% hydrogen peroxide solution to remove color. Post reaction analysis indicates 98.4% conversion of itaconic acid and non-detectable levels of ethyl acrylate. The viscosity is 393 centipoise. A calibrated absolute number average molecular weight for the polymer of 8140 using gel permeation chromatography with light scattering detector is indicated.

Example 3

In a 500 ml reactor, the following ingredients are added: 130 g itaconic acid, 69.1 g glycerol, 85 g water and 2 g sodium persulfate. After purging with nitrogen for 20 minutes, the reaction mixture is heated to 75° C. under nitrogen over a period of 30 minutes. The addition of an initiator in the form of a solution of 4.5 g sodium persulfate in 20 g water is commenced, the initiator being metered in over a period of 5 hours. The reaction temperature is raised to 78° C. after the initiator is metered in. The temperature is maintained at that level for 90 minutes. The reaction mixture is cooled in air to 60° C. When the 60° C. temperature is reached, a redox system of 0.63 g sodium persulfate in 10 g water, and 0.63 g of Bruggolite® FF6 in 10 g water, is added, the additions being in sequence. The reaction mixture is stirred for 1 hour as the temperature is reduced to below 30° C. 69 g of water are added. Post reaction analysis using proton NMR indicates that 93.8% by weight of the itaconic acid is converted to polymer, the polymer containing 14% by weight grafted glycerol.

Example 4

In a 500 ml reactor, the following ingredients are added: 130 g itaconic acid, 154 g water and 2 g sodium persulfate. After purging with nitrogen for 20 minutes, the reaction mixture is heated to 75° C. under nitrogen over a period of 30 minutes. The addition of an initiator in the form of a solution of 4.5 g sodium persulfate in 20 g water is commenced, the initiator being metered in over a period of 5 hours. The reaction temperature is raised to 78° C. after the initiator is metered in. The temperature is maintained at that level for 90 minutes. The reaction is cooled in air to 60° C. When the 60° C. temperature is reached, a redox system of 0.63 g sodium persulfate in 10 g water, and 0.63 g of Bruggolite® FF6 in 10 g water, is added, the additions being in sequence. The reaction mixture is stirred for 1 hour as the temperature is reduced to below 30° C. 69 g of water are added. 69.1 g of glycerol are added. Post reaction analysis using proton NMR indicates that 88.7% by weight of the itaconic acid is converted to polymer. The polymer contains no grafted glycerol.

Example 5

In a 500 ml reactor, the following ingredients are added: 130 g itaconic acid, 69.1 g glycerol, 85 g water, 5 g sodium hypophosphite, and 2 g sodium persulfate. After purging with nitrogen for 20 minutes, the reaction mixture is heated to 75° C. under nitrogen over a period of 30 minutes. The addition of an initiator in the form of a solution of 4.5 g sodium persulfate in 20 g water is commenced, the initiator being metered in over a period of 5 hours. The reaction temperature is raised to 78° C. after the initiator is metered in. The temperature is maintained at that level for 90 minutes. The reaction is cooled in air to 60° C. When the 60° C. temperature is reached, a redox system of 0.63 g sodium persulfate in 10 g water, and 0.63 g of Bruggolite® FF6 in 10 g water, is added, the additions being in sequence. The reaction mixture is stirred for 1 hour as the temperature is reduced to below 30° C. 69 g of water are added. Post reaction analysis using proton NMR indicates that 98.4% by weight of the itaconic acid is converted to polymer. The polymer contains 13.8% by weight grafted glycerol.

Example 6

In a 500 ml reactor, the following ingredients are added: 130 g itaconic acid, 154 g water, 5 g sodium hypophosphite, and 2 g sodium persulfate. After purging with nitrogen for 20 minutes, the reaction mixture is heated to 75° C. under nitrogen over a period of 30 minutes. The addition of an initiator in the form of a solution of 4.5 g sodium persulfate in 20 g water is commenced, the initiator being metered in over a period of 5 hours. The reaction temperature is raised to 78° C. after the initiator is metered in. The temperature is maintained at that level for 90 minutes. The reaction is cooled in air to 60° C. When the 60° C. temperature is reached, a redox system of 0.63 g sodium persulfate in 10 g water, and 0.63 g of Bruggolite FF6 in 10 g water, is added, the additions being in sequence. The reaction mixture is stirred for 1 hour as the temperature is reduced to below 30° C. 69 g of water are added. 69.1 g of glycerol are added. Post reaction analysis using proton NMR indicates that 96.6% by weight of the itaconic acid is converted to polymer. The polymer contains no grafted glycerol.

Examples 3 and 5 are conducted using glycerol during the polymerization reaction, while in Examples 4 and 6; glycerol is not added until after the polymerization reaction is completed. In Examples 3 and 5, glycerol is grafted onto the polymer backbone. With Examples 4 and 6, there is no grafting. Example 3 (grafted) shows a higher conversion of itaconic acid to polymer than Example 4 (not-grafted). Similarly, Example 5 (grafted) shows a higher conversion than Example 6 (not-grafted). Placing glycerol in the reactor consistently increases the conversion of itaconic acid to polyitaconic acid, leaving less residual unreacted itaconic acid, which does not help the binder's performance.

Example 7

In a 500 ml reactor, the following ingredients are added: 130 g itaconic acid, 11.6 g 2-hydroxyethyl acrylate, 46.1 g glycerol, 4.2 g sodium hypophosphite hydrate, 146.4 g water and 1.3 g ammonium persulfate. After purging with nitrogen for 20 minutes, the reaction mixture is heated to 73° C. under nitrogen over a period of 30 minutes. The addition of an initiator in the form of a solution of 3.9 g ammonium persulfate in 20 g water is commenced, the initiator being metered in over a period of 6 hours. The reaction is continued for 90 minutes. The reaction is cooled in air to 60° C. 116 g of water are added. The pH is raised to 3.0 by adding concentrated ammonium hydroxide. Post reaction analysis using proton NMR indicates that 95.4% by weight of the itaconic acid is converted to polymer.

Example 8

In a 2 liter reactor, the following ingredients are added: 390 g itaconic acid, 34.8 g 2-hydroxyethyl acrylate, 41 g of a 52% solution of acrylamide, 138.2 g glycerol, 456 g water and 6 g ammonium persulfate. The reaction mixture is heated to 72° C. under nitrogen while 11.7 g ammonium persulfate in 60 g water are metered in over a period of 5 hours. The reaction mixture is heated for 2 more hours before being cooled down. 400 g water are added. A sample of 350 g of the reaction mixture is mixed with 10.5 g hydrogen peroxide to remove color. The residual itaconic acid level is 4% by weight as determined by proton NMR. The pH is 2.44.

Example 9

In a 500 ml reactor, the following ingredients are added: 130 g itaconic acid, 13.65 g of 52% by weight aqueous acrylamide solution, 90.6 g of glycerol, 2 g ammonium persulfate, and 200 g water. The reaction mixture is heated to 73° C. over a period of 30 minutes. The addition of an initiator in the form of 4.5 g of ammonium persulfate in 20 g of water is commenced, the initiator being metered in over a period of 5 hours. 10 minutes after the addition of the initiator is commenced, the addition of a stream of the following monomers is commenced: 4.5 g of ethyl acrylate and 10.44 g of 2-hydroxyethyl acrylate. The monomer stream is metered in over a period of 3.5 hours. The temperature is raised to 75° C. after the addition of the initiator is completed. The temperature is held at 75° C. for 60 minutes, and then cooled to 65° C. A mixture of 0.63 g of Bruggolite® FF6 in 5 g of water is added. The pH is adjusted to 3.0 by adding ammonium hydroxide. Proton NMR analysis indicates that 98% by weight of the itaconic acid is converted to polymer.

Example 10

In a 500 ml reactor, the following ingredients are added: 130 g itaconic acid, 13.65 g of 52% by weight aqueous acrylamide solution, 2 g ammonium persulfate, and 150 g water. The reaction mixture is heated to 73° C. over a period of 30 minutes. The addition of an initiator in the form of 4.5 g of ammonium persulfate in 20 g of water is commenced, the initiator being metered in over a period of 5 hours. 10 minutes after the addition of the initiator is commenced, the addition of a stream of the following monomers is commenced: 4.5 g of ethyl acrylate and 10.44 g of 2-hydroxyethyl acrylate. The monomer stream is metered in over a period of 3.5 hours. The temperature is raised to 75° C. after the addition of the initiator is completed. The temperature is held at 75° C. for 60 minutes, and then cooled to 65° C. A mixture of 0.63 g of Bruggolite® FF6 in 5 g of water is added. 90.6 g of glycerol are added. Water is added to provide a solids content of 40% by weight. The pH is adjusted to 3.0 by adding ammonium hydroxide. Proton NMR analysis indicates that 98% by weight of the itaconic acid is converted to polymer.

Example 11

In a 500 ml reactor, the following ingredients are added: 130 g itaconic acid, 77.65 g glycerol, 4.5 g ethyl acrylate, 10.44 g 2-hydroxyethyl acrylate, 13.65 g of 52% by weight aqueous acrylamide solution, 1 g trimethylolpropane-triacylate, 2 g sodium persulfate, and 200 g water. Under nitrogen, the reaction mixture is heated to 75° C. over a period of 20 minutes. The addition of an initiator in the form of 4.0 g of sodium persulfate in 20 g of water is commenced, the initiator being metered in over a period of 4 hours. The temperature is raised to 78° C. after the addition of the initiator is completed. The temperature is held at 78° C. for 75 minutes, and then cooled to 60° C. A mixture of 0.63 g sodium persulfate in 3 g of water is added, followed by 0.63 g of Bruggolite® FF6 in 3 g of water. A solution of 20% sodium hydroxide is added to raise the pH to 2.6. The viscosity is 555 centipoise. The level of residual itaconic acid is 4.5% by weight. The number average molecular weight of the polymer is 8810.

Example 12

In a 500 ml reactor, the following ingredients are added: 130 g itaconic acid, 86.4 g glycerol, and 200 g water. The reaction mixture is heated to 75° C. over a period of 20 minutes. The addition of an initiator in the form of 6 g of sodium persulfate in 30 g of water is commenced, the initiator being metered in over a period of 5 hours. 10 minutes after the addition of the initiator is commenced, the addition of the following stream is commenced: 4.5 g of ethyl acrylate, 10.44 g of 2-hydroxyethyl acrylate, 13.65 g of 52% by weight aqueous acrylamide solution, 2 g polyethyleneglycol diacrylate and 7 g water. This stream is metered in over a period of 2 hours. The temperature is raised to 78° C. after the addition of the initiator is completed. The temperature is held at 78° C. for 60 minutes, and then cooled to 60° C. A mixture of 0.63 g sodium persulfate in 5 g water is added, followed by 0.53 g sodium bisulfate in 5 g of water. The temperature is cooled to 30° C. 2.86 g concentrated ammonia are added to raise the pH to 2.6. 4.64 g of 35% hydrogen peroxide are added to remove color. The residual level of ethyl acrylate is 62 ppm (GPC), and the residual level of itaconic acid monomer is 5.2% by weight using proton NMR.

Example 13

In a 500 ml reactor, the following ingredients are added: 130 g itaconic acid, 68.3 g glycerol, and 200 g water. The reaction mixture is heated to 75° C. over a period of 20 minutes while stirring under nitrogen. The addition of an initiator in the form of 4 g of sodium persulfate in 20 g of water is commenced, the initiator being metered in over a period of 4 hours. 10 minutes after the addition of the initiator is commenced, the addition of the following stream is commenced: 4.5 g of ethyl acrylate, 10.44 g of 2-hydroxyethyl acrylate, 13.65 g of 52% by weight aqueous acrylamide solution. This stream is metered in over a period of 2 hours. The temperature is raised to 78° C. after the addition of the initiator is completed. The temperature is held at 78° C. for 75 minutes, and then cooled to 60° C. A mixture of 0.63 g sodium persulfate in 5 g water is added. The temperature is cooled to 30° C. 18.77 g of 20% NaOH are added to raise the pH to 2.6. 6.8 g of 50% hydrogen peroxide are added to remove color. The residual level of itaconic acid monomer is 2.9% by weight using proton NMR.

Test samples of reinforced fiberglass are prepared. A Walco test device supplied by the Wallace Company of Pasadena, Calif., is used. The device is identified as Padder 2 and employs a single phase DC drive, DE 2R series. The polymer is diluted in demineralized water to form an aqueous binder with a concentration of 9-11% by weight polymer. The fiberglass substrate is a Whatman Glass Microfibre Filter, Grade GF/A. The Walco test device is used to saturate the fiberglass substrate with the aqueous binder and remove excess polymer. The saturated fiberglass substrate is dried and air in an oven at 375° F. (190.6° C.) for 2 minutes. The polymer is calculated to be about 25% by weight add-on (about 20% by weight loss on ignition). Saturated and cured fiberglass test samples are tested for: (1) dry tensile strength; (2) hot wet tensile strength (82° C. for 10 minutes soaking in demineralized water before testing using a sample size of 1×6 inches (2.54×15.24 cm)); (3) hot dry tensile strength (375° F. (190.6° C.) for 1 minute of aging before testing while at 375° F. (190.6° C.) using a sample size of 1×9 inches (2.54×22.86 cm); and (4) plasticizer resistance (room temperature soaking in diisononyl phthalate (DINP)) for 2 minutes using a sample size of 1×6 inches (2.54×15.24 cm). The fiberglass test substrate does not have a machine drive direction (MD) or a cross-direction (CD), but the lengthwise direction is assumed to be a MD and, consequently, one set of tests is used. Binders containing polyitaconic acid are compared to a binder comprising a commercial acrylic latex emulsion that is crosslinked using hexamethoxy melamine. The results are indicated in Tables 1-3.

TABLE 1

| Polymer | Aqueous Binder pH | Pick Up % | Dry Strength (lbs) | Hot Wet Strength (lbs) | Hot Dry Strength (lbs) | Plasticizer Strength (lbs) |
|---|---|---|---|---|---|---|
| Control in form of commercial fiberglass binder - acrylic latex emulsion mixed with melamine formaldehyde resin | — | 25.1 | 12.0 | 2.94 | 4.80 | 10.4 |
| Example 1 | 3.3 | 26.1 | 12.5 | 7.27 | 10.9 | 9.28 |
| Example 2 | 3.3 | 27.6 | 14.2 | 7.90 | 9.44 | 10.8 |

TABLE 2

| Polymer | Aqueous Binder pH | Pick Up % | Dry Strength (lbs) | Hot Wet Strength (lbs) | Hot Dry Strength (lbs) | Plasticizer Strength (lbs) |
|---|---|---|---|---|---|---|
| Control in form of commercial fiberglass binder - acrylic latex emulsion mixed with melamine formaldehyde resin | — | 25.9 | 9.81 | 2.49 | 4.47 | 7.64 |
| Example 7 | 3.6 | 25.9 | 10.7 | 5.09 | 10.2 | 8.49 |
| Example 8 | 2.4 | 26.2 | 9.04 | 4.49 | 7.12 | 7.27 |
| Example 9 | 3.4 | 23.8 | 10.5 | 6.37 | 6.50 | 9.51 |
| Example 10 | 3.0 | 23.5 | 10.1 | 4.10 | 8.07 | 8.45 |

TABLE 3

| Polymer | Aqueous Binder pH | Pick Up % | Dry Strength (lbs) | Hot Wet Strength (lbs) | Hot Dry Strength (lbs) | Plasticizer Strength (lbs) |
|---|---|---|---|---|---|---|
| Control in form of commercial fiberglass binder - acrylic latex emulsion mixed with melamine formaldehyde resin | — | 25.6 | 11.5 | 2.02 | 5.10 | 8.08 |
| Example 2 | 3.3 | 27.4 | 11.9 | 8.33 | 14.6 | 9.82 |
| Example 12 | 2.6 | 27.0 | 12.0 | 7.59 | 11.7 | 8.85 |
| Example 11 | 2.6 | 26.2 | 11.1 | 8.30 | 9.78 | 9.45 |

The foregoing tests show advantageous results for the inventive polymers as compared to the control. The hot/wet tensile strength results are particularly significant and advantageous due to the fact that the fiberglass products produced using the inventive polymers may be used in hot/wet environments. The inventive polymers exhibit significantly improved hot/wet tensile strengths as compared to the control.

While the invention has been explained in relation to various embodiments, it is to be understood that various modifications thereof may become apparent to those skilled in the art upon reading this specification. Therefore, it is to be understood that the invention includes all such modifications that may fall within the scope of the appended claims.

The invention claimed is:

1. A polymer, comprising structural units derived itaconic acid, or an anhydride or salt thereof, the polymer having a number average molecular weight of about 5000 or higher and at least 70% by weight of the polymer being derived from itaconic acid, itaconic anhydride, and/or itaconic acid salt and wherein said polymer has a backbone and said backbone is grafted with one or more polyols.

2. The polymer of claim 1, wherein the polymer is a homopolymer of itaconic acid in the form of itaconic acid, itaconic acid anhydride, itaconic acid salt and mixtures thereof.

3. The polymer of claim 1, wherein the polymer is a copolymer, the copolymer comprising structural units derived from itaconic acid, or an anhydride or salt thereof, and structural units derived from one or more $C_1$-$C_{18}$ alkyl(meth)acrylates; wherein the amount of structural units derived from co-monomers to itaconic acid, its anhydride and/or its salt is from 5 to 30 weight percent based on the weight of the copolymer.

4. The polymer of claim 3, wherein the alkyl group is a straight chain group or a branched chain group.

5. The polymer of claim 1, wherein the polymer is a copolymer comprising structural units derived from itaconic acid, or an anhydride or salt thereof, and structural units derived from one or more co-monomers comprising methyl acrylate, ethyl acrylate, butyl acrylate, 2-hydroxyethyl acrylate, 2-hydroxyethyl methacrylate, stearyl acrylate, polyethyleneglycol monomethylether acrylate, acrylamide, $C_1$-$C_{18}$ N-alkyl (meth)acrylamide, styrene, substituted styrene, vinyl ester, vinyl acetate, acrylic acid, sodium salt of acrylic acid, acrylamido methanesulfonic acid, sodium salt of acrylamido methanesulfonic acid, maleic acid, sodium salt of maleic acid, (meth)acrylonitrile, or a mixture of two or more thereof.

6. The polymer of claim 1, wherein the polymer comprises a copolymer, the copolymer comprising structural units derived from itaconic acid, or an anhydride or salt thereof, and structural units derived from one or more co-monomers, the polymer comprising from 5 to 30% by weight of the structural units derived from the one or more co-monomers.

7. The polymer of claim 1, wherein up to 30% of the structural units derived from itaconic acid, or an anhydride or salt thereof, are grafted with a polyol.

8. The polymer of claim 7, wherein the polyol has a molecular weight of up to 1000 and contains 2 or more hydroxyl groups.

9. The polymer of claim 7, wherein the polyol comprises ethylene glycol, glycerol, 1,3-propane diol, starch, pentaerythritol, trimethylolpropane, sorbitol, sucrose, xylitol, glucose, resorcinol, catechol, pyrogallol, glycollated ureas, 1,4-cyclohexanediol, diethanolamine, triethanolamine, or a mixture of two or more thereof.

10. A grafted polymer, comprising structural units derived itaconic acid, the polymer having a number average molecular weight in the range from about 5000 to about 10,000, the polymer being grafted with one or more polyols; and at least 70% by weight of the polymer being derived from itaconic acid, itaconic anhydride, and/or itaconic acid salt.

11. An aqueous binder composition, comprising: water and the polymer of claim 1.

12. The composition of claim 11, wherein the composition further comprises monomeric itaconic acid, the concentration of monomeric itaconic acid being up to 15% by weight.

13. The composition of claim 11, wherein the composition further comprises one or more polyols that are not grafted to the polymer, the concentration of the one or more non-grafted polyols being up to 30% by weight.

14. The composition of claim 11, wherein the aqueous binder composition further comprises one or more emulsifiers, pigments, fillers, anti-migration aids, curing agents, coalescents, wetting agents, biocides, plasticizers, organosilanes, antifoaming agents, colorants, waxes, antioxidants, or a mixture of two or more thereof.

15. The composition of claim 11, wherein the aqueous binder composition is characterized by the absence of formaldehyde.

16. A process for making the polymer of claim 1, comprising polymerizing itaconic acid, or an anhydride or salt thereof, and optionally, one or more co-monomers, in the presence of one or more polyols.

17. The process of claim 16, wherein the polymerization process is conducted using a reaction mixture, the reaction mixture comprising a phosphorus-containing accelerator.

18. The process of claim 16, wherein the polymerization reaction is completed and the polymer exhibits undesirable levels of color, the process further comprising mixing hydrogen peroxide with the polymer to remove color or reduce the color to a desirable level.

19. A fiberglass product, comprising: matted glass fibers bonded together by a cured polymeric material, the cured polymeric material being derived from the polymer of claim 7.

20. The polymer of claim 3, wherein the co-monomers comprise 2 or more co-monomers selected from the group consisting of ethyl acrylate, 2-hydroxyethyl acrylate, and acrylamide.

21. The process of claim 16, wherein the residual itaconic acid monomer at the end of the polymerization is less than 5 wt. % based on the itaconic acid charged to the reactor.

* * * * *